(12) United States Patent
Cho et al.

(10) Patent No.: US 10,142,579 B2
(45) Date of Patent: Nov. 27, 2018

(54) DISPLAY APPARATUS AND DISPLAY METHOD

(71) Applicant: SAMSUNG ELECTRONICS CO., LTD., Suwon-si (KR)

(72) Inventors: Hong-jin Cho, Seoul (KR); Sung-sik Park, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/990,930

(22) Filed: Jan. 8, 2016

(65) Prior Publication Data

US 2016/0205337 A1 Jul. 14, 2016

(30) Foreign Application Priority Data

Jan. 9, 2015 (KR) .................. 10-2015-0003474

(51) Int. Cl.
| | |
|---|---|
| *H04N 5/63* | (2006.01) |
| *H04N 5/44* | (2011.01) |
| *G06F 3/01* | (2006.01) |
| *H04N 21/41* | (2011.01) |
| *H04N 21/4363* | (2011.01) |
| *H04N 21/443* | (2011.01) |
| *H04N 21/472* | (2011.01) |
| *H04N 21/482* | (2011.01) |

(Continued)

(52) U.S. Cl.
CPC .......... *H04N 5/4403* (2013.01); *G06F 3/017* (2013.01); *H04N 21/4126* (2013.01); *H04N 21/43637* (2013.01); *H04N 21/4432* (2013.01); *H04N 21/472* (2013.01); *H04N 21/482* (2013.01); *H04N 5/45* (2013.01); *H04N 2005/44521* (2013.01); *H04N 2005/44556* (2013.01)

(58) Field of Classification Search
CPC .......... H04N 5/38; H04N 5/44; H04N 5/4403; H04N 21/4126; H04N 21/43637; H04N 21/4432; H04N 21/472; H04N 21/482; H04N 5/45; H04N 2005/44521; H04N 2005/44556; G06F 3/01; G06F 3/017
USPC ................................. 348/730, 552, 725, 723
See application file for complete search history.

(56) References Cited

U.S. PATENT DOCUMENTS

| | | |
|---|---|---|
| 7,130,584 B2 | 10/2006 | Hirvonen |
| 8,469,816 B2 | 6/2013 | Liu et al. |
| 8,781,828 B2 | 7/2014 | Park et al. |

(Continued)

FOREIGN PATENT DOCUMENTS

| | | |
|---|---|---|
| JP | 2006-245957 A | 9/2006 |
| JP | 2009-094799 A | 4/2009 |

(Continued)

*Primary Examiner* — Trang U Tran
(74) *Attorney, Agent, or Firm* — Sughrue Mion, PLLC

(57) ABSTRACT

A display apparatus and a display method are provided. The display apparatus includes a communicator configured to receive a pre-power on command signal from an external device, and a controller configured to activate a network communication function of the display apparatus based on the pre-power on command signal. The communicator is further configured to receive information of content from the external device, in response to the controller activating the network communication function, and the controller is further configured to reproduce the content based on the information of the content.

18 Claims, 15 Drawing Sheets

(51) Int. Cl.
    *H04N 5/445*    (2011.01)
    *H04N 5/45*     (2011.01)

(56)           References Cited

U.S. PATENT DOCUMENTS 8,789,130  B2 *   7/2014   Howarter ........... H04N 21/4227
                                                           725/109
    9,239,837  B2 *   1/2016   Chardon ............ G06F 17/30011
    9,582,069  B2 *   2/2017   Chen ..................... G06F 1/3296
 2008/0111698  A1     5/2008   Atherton
 2011/0069184  A1     3/2011   Go
 2012/0030619  A1     2/2012   Lee et al.
 2012/0096503  A1     4/2012   Slothouber et al.
 2012/0208465  A1     8/2012   Choi et al.
 2012/0278603  A1 *  11/2012   Lee ...................... G06F 9/4418
                                                             713/2
 2013/0021535  A1     1/2013   Kim et al.
 2013/0159876  A1     6/2013   Narasimhan et al.
 2013/0160113  A1     6/2013   Yoon et al.

2013/0176500  A1 *   7/2013   Nagata ..................... H04N 5/38
                                                             348/723
 2013/0346546  A1    12/2013   Jung
 2014/0104141  A1     4/2014   Hwang
 2015/0016799  A1     1/2015   Park et al.

FOREIGN PATENT DOCUMENTS

JP        2009-118181 A        5/2009
    JP        2012-048297 A        3/2012
    JP        2012-205251 A       10/2012
    JP        2012-244315 A       12/2012
    JP        2013-138481 A        7/2013
    KR        10-0710740 B1        4/2007
    KR        10-0968610 B1        7/2010
    KR     10-2012-0093001 A        8/2012
    KR     10-2013-0068361 A        6/2013
    KR     10-2013-0114405 A       10/2013
    KR     10-2013-0142642 A       12/2013
    KR        10-1411739 B1        6/2014

* cited by examiner

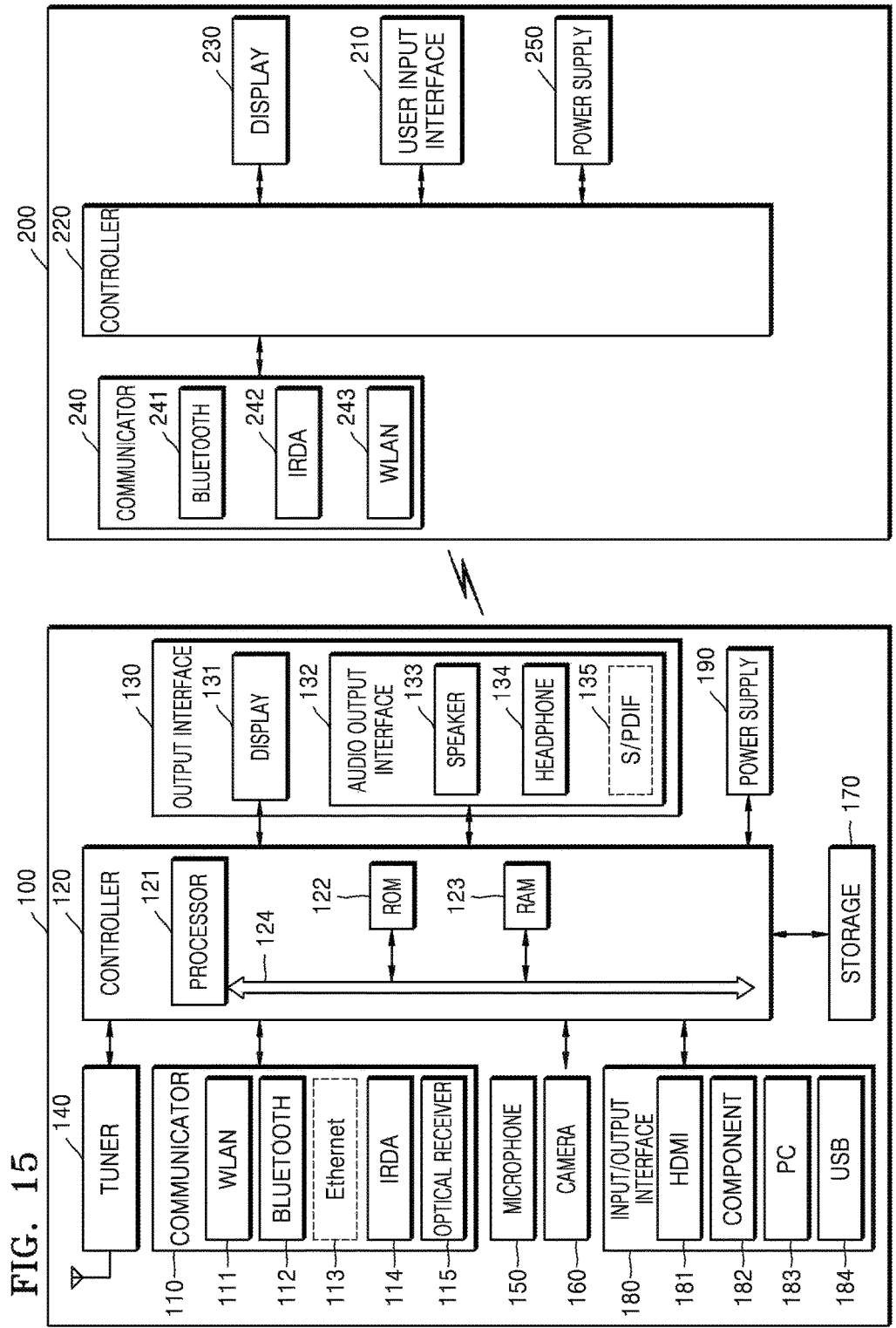

DISPLAY APPARATUS AND DISPLAY METHOD

CROSS-REFERENCE TO RELATED APPLICATION

This application claims priority from Korean Patent Application No. 10-2015-0003474, filed on Jan. 9, 2015, in the Korean Intellectual Property Office, the disclosure of which is incorporated herein by reference in its entirety.

BACKGROUND

1. Field

Apparatuses and methods consistent with exemplary embodiments relate to a display apparatus and a display method, and more particularly, to a display apparatus displaying, on a screen, content selected in an external device and a method of displaying content via the display apparatus.

2. Description of the Related Art

A display apparatus has a function of displaying contents desired by a user on a screen. The user may receive broadcasting contents via a display apparatus.

A smart TV, which is an example of a display apparatus, has been recently developed and is capable of providing various types of contents from a broadcasting station or an Internet network according to a user's selection.

The display apparatus may be connected to a control device in a wireless manner, for example, via Bluetooth or Wi-Fi, to receive a control signal. The user may turn on the display apparatus via a controller and then select desired contents. The user is able to move to content that the user has previously watched after an amount of time passes after a control signal for turning on the display apparatus is received. Thus, the amount of time taken to display content selected by the user on the display apparatus via the control device may have to be reduced.

SUMMARY

Exemplary embodiments may address at least the above problems and/or disadvantages and other disadvantages not described above. Also, the exemplary embodiments are not required to overcome the disadvantages described above, and may not overcome any of the problems described above.

According to an aspect of an exemplary embodiment, there is provided a display apparatus including a communicator configured to receive a pre-power on command signal from an external device, and a controller configured to activate a network communication function of the display apparatus based on the pre-power on command signal. The communicator is further configured to receive information of content from the external device, in response to the controller activating the network communication function, and the controller is further configured to reproduce the content based on the information of the content.

The controller may be further configured to activate an outputting function of the display apparatus with respect to video and audio data, in response to the communicator receiving the information of the content.

The controller may be further configured to obtain the content based on the information of the content, and output video and audio data of the obtained content.

The information of the content may include at least one among information of an application providing the content, information of a universal resource locator via which the content is obtained, and information of a channel via which the content is provided.

The information of the content may be the information of the application providing the content, and the controller may be further configured to determine whether the application is installed based on the information of the application, and obtain the content via the application, in response to the controller determining that the application is installed.

The controller may be further configured to obtain an installation program of the application, in response to the controller determining that the application is not installed.

The controller may be further configured to turn off a power supply of the display apparatus, in response to the communicator not receiving the information of the content during a period of time after the communicator receives the pre-power on command signal.

The pre-power on command signal may be generated in the external device based on a user motion input with respect to the external device.

According to an aspect of another exemplary embodiment, there is provided a control device including a communicator configured to transmit, to an external display apparatus, a pre-power on command signal directing an activation of a network communication function of the external display apparatus, and a display configured to display a user interface for selecting content. The control device further includes a controller configured to control the communicator to transmit information of the selected content to the external display apparatus based on a user input of selecting the content via the user interface.

According to an aspect of another exemplary embodiment, there is provided a method of displaying content, the method being performed by a display apparatus, and the method including receiving a pre-power on command signal from an external device, and activating a network communication function of the display apparatus based on the pre-power on command signal. The method further includes receiving information of the content from the external device, in response to the activating the network communication function, and reproducing the content based on the information of the content.

The reproducing may include activating an outputting function of the display apparatus with respect to video and audio data, in response to the receiving the information of the content.

The reproducing may further include obtaining the content based on the information of the content, and outputting video and audio data of the obtained content.

The information of the content may be the information of the application providing the content, and the obtaining may include determining whether the application is installed based on the information of the application, and obtaining the content via the application, in response to the determining that the application is installed.

The obtaining the content based on the information of the content may further include obtaining an installation program of the application, in response to the determining that the application is not installed.

The method may further include turning off a power supply of the display apparatus, in response to not receiving the information of the content during a period of time after the receiving the pre-power on command signal.

A non-transitory computer-readable storage medium may store a program to cause a computer to perform the method.

According to an aspect of another exemplary embodiment, there is provided a method of controlling an external display apparatus, the method being performed by a control device, and the method including transmitting, to the external display apparatus, a pre-power on command signal directing an activation of a network communication function of the external display apparatus, and displaying a user interface for selecting content. The method further includes transmitting information of the selected content to the external display apparatus based on a user input of selecting the content via the user interface.

A non-transitory computer-readable storage medium may store a program to cause a computer to perform the method.

BRIEF DESCRIPTION OF THE DRAWINGS

The above and/or other aspects will be more apparent by describing exemplary embodiments with reference to the accompanying drawings, in which:

FIG. 15 is a detailed block diagram of a display apparatus and a control device, according to an exemplary embodiment.

DETAILED DESCRIPTION

Figure 1:
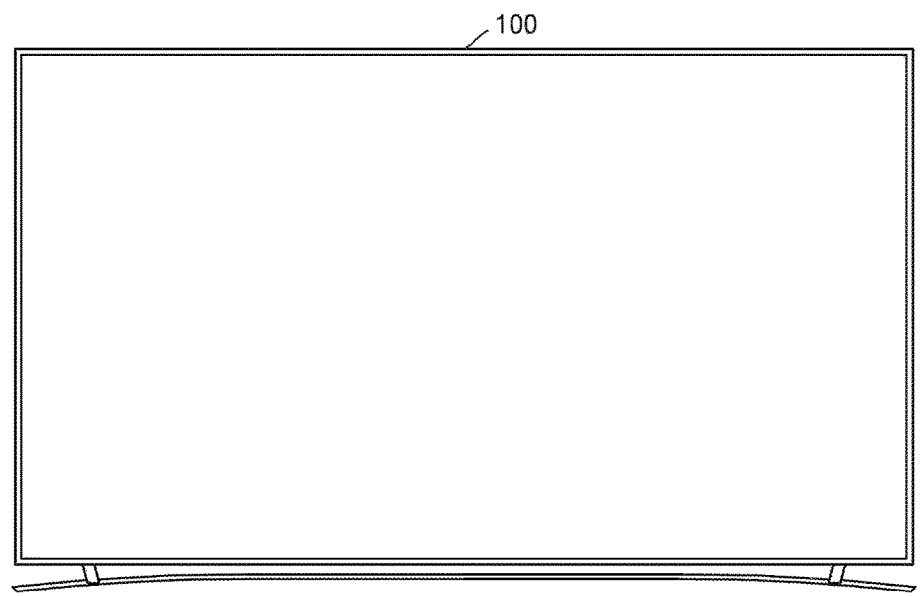
FIG. 1 is a schematic view of a display system according to an exemplary embodiment.
Figure 1:
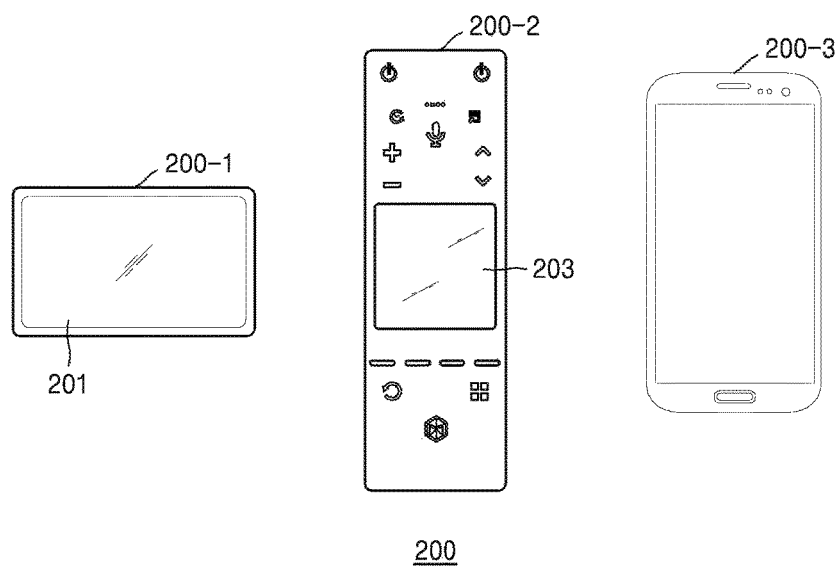

Exemplary embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the exemplary embodiments. However, it is apparent that the exemplary embodiments can be practiced without those specifically defined matters. Also, well-known functions or constructions may not be described in detail because they would obscure the description with unnecessary detail.

It will be understood that the terms "comprises" and/or "comprising" used herein specify the presence of stated features or components, but do not preclude the presence or addition of one or more other features or components. In addition, the terms such as "unit", "-er (-or)", and "module" described in the specification refer to an element for performing at least one function or operation, and may be implemented in hardware, software, or the combination of hardware and software.

Throughout the specification, a "power off state" of a display apparatus may indicate a state in which a power plug of the display apparatus and a power source (e.g., an electric outlet) are connected to each other. When the display apparatus having a power plug connected to a power supply is in a power off state, power may be supplied to the display apparatus (for example, the display apparatus may be turned on) via a control signal received from a control device. Also, when a power plug and a power source are connected, some communication functions of the display apparatus may be activated to receive a control signal from the control device.

Throughout the specification, "content" may indicate information that may be provided via a broadcasting network or the Internet or the like. Examples of the content may include video content (e.g., TV program videos, video on demand (VOD), personal videos (e.g., user-created contents (UCC)), music videos, or YouTube videos), still image content (e.g., pictures or drawings), text content (e.g., e-book (poetry or novels), letter, work files), music content (e.g., music, radio broadcasts or the like), web pages, and application execution information, but are not limited thereto.

Throughout the specification, a "user" may refer to a person who controls a function or operation of a display apparatus, such as a viewer, a managing person or an installation engineer.

Throughout the specification, a "user input" may include a touch input, a voice input, a button input, and a user motion input with respect to an apparatus. The touch input may be performed by at least one of gestures such as a touch, a hold, a tap, a drag, a flick, pinching, a touch&drag, and a touch&hold.

FIG. 1 is a schematic view of a display system according to an exemplary embodiment.

Referring to FIG. 1, the display system includes a control device 200 and a display apparatus 100 that communicates with the control device 200 in a wired or wireless manner.

The control device 200 may control the display apparatus 100 via short range communication including infrared communication or Bluetooth. In addition, the control device 200 may control a function of the display apparatus 100 by using at least one of a key (e.g., buttons) included in the control device 200, a touch pad, a microphone for receiving voice of a user, and a sensor for sensing motion of a user. For example, the control device 200 may turn on or off the display apparatus 100 according to a user input of the display apparatus 100, and may be used to select content, change a channel, adjust volume, or set an environment setting.

The control device 200 may be implemented in various forms. According to an exemplary embodiment, the control device 200 may include remote controllers 200-1 and 200-2 respectively including touch screens 201 and 203, and be linked to the display apparatus 100. If the control device 200 is linked to the display apparatus 100, the display apparatus 100 and the control device 200 are maintained in a paired state. Thus, the display apparatus 100 and the control device 200 may store each other's addresses.

Alternatively, the control device 200 may be a mobile device 200-3 of the user. In this case, the user may control the display apparatus 100 via an application installed on the mobile device 200-3. The mobile device 200-3 may obtain information about the display apparatus 100 via a user input or automatically.

The display apparatus 100 may be not only a flat display apparatus but also a curved display apparatus having a curved screen or a flexible display apparatus having adjustable curvature. An output resolution of the display apparatus 100 may be, for example, high definition (HD), full HD, ultra HD, or a clearer resolution than ultra HD. Also, an aspect ratio of a screen of the display apparatus 100 may be, for example, 4:3, 16:9, 16:10, 21:9 or 21:10.

According to an exemplary embodiment, when the display apparatus 100 is in a power off state, the display apparatus 100 may receive a pre-power on command signal from the control device 200. The pre-power on command signal may be generated by the control device 200 and transmitted to the display apparatus 100 via Bluetooth or Wi-Fi. The pre-power on command signal may be generated according to a user motion input of gripping the control device 200 or a user input of turning on the control device 200. Gripping the control device 200 may indicate a motion of a user gripping a housing of the control device 200.

The display apparatus 100 may perform an operation of activating a network communication function of the display apparatus 100 in response to a pre-power on command signal. Thus, the display apparatus 100 may perform data communication with an external device (e.g., a content provider or a broadcasting provider) via a network. However, the display apparatus 100 may not perform an operation of outputting data processed in the display apparatus 100 (e.g., turning on a screen of the display apparatus 100). Thus, the screen of the display apparatus 100 may be still turned off. Thus, the user may recognize that the display apparatus 100 is still in a power off state.

Also, the control device 200 may provide a content list, a broadcasting channel list or the like via a screen of the control device 200. The content list may be a list of contents that are reproducible on the display apparatus 100. The broadcasting channel list may be a list of broadcasting channels that may be received via the display apparatus 100. The control device 200 may receive a user input of selecting one piece of content from the content list. Alternatively, the control device 200 may receive a user input of selecting a broadcasting channel from the broadcasting channel list. The control device 200 may transmit information about selected content or a selected broadcasting channel to the display apparatus 100 based on a user input.

The display apparatus 100 may obtain content based on the information about the selected content or broadcasting channel. In addition, the display apparatus 100 may perform an operation of outputting video or audio data to reproduce the obtained content. Thus, if the user selects content on the control device 200, the user may perceive that the selected content is immediately output on the display apparatus 100. As a result, a booting period of the display apparatus 100 that is perceived by the user may be reduced according to the display system of an exemplary embodiment.

As described above, in the display system, an additional user input of turning on the display apparatus 100 is not required, but content selected via the control device 200 may be immediately output from the display apparatus 100.

Figure 2:
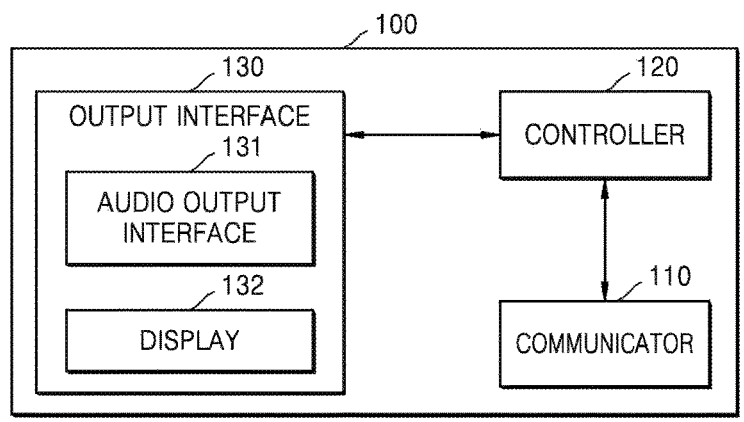
FIG. 2 is a block diagram illustrating a display apparatus according to an exemplary embodiment.

FIG. 2 is a block diagram illustrating the display apparatus 100 according to an exemplary embodiment.

Referring to FIG. 2, the display apparatus 100 includes a communicator 110, a controller 120, and an output interface 130.

The communicator 110 may include one or more elements that enable communication between the display apparatus 100 and an external device (e.g., the control device 200, a content provider or a broadcasting provider). For example, the communicator 110 may communicate with the control device 200 and/or an external device via a wireless local area network (WLAN), Bluetooth communication, infrared data association (IrDA) communication, Ethernet communication, or the like, but is not limited thereto. For example, the communicator 110 may also include an optical receiver to receive a control signal from the control device 200.

The communicator 110 according to an exemplary embodiment may receive a pre-power on command signal from the control device 200. The pre-power on command signal may be a Bluetooth signal, an RF signal, an optical signal, or a Wi-Fi signal. The communicator 110 may provide the controller 120 with the received pre-power on command signal.

The controller 120 may control an overall operation of the display apparatus 100. For example, the controller 120 may control a booting operation of the display apparatus 100 based on a control signal received from the control device 200.

In the present specification, a booting operation may be divided into a first booting operation and a second booting operation. For convenience of description, a booting operation is assumed to include driving an operating system (OS), mounting an application on a memory, activating a network communication function, acquiring content to be displayed, decoding the content, and outputting decoded content. However, a booting operation is not limited to the above six operations, and some of the operations may be omitted or one or more operations may be added thereto according to an exemplary embodiment. For example, a booting operation may include, instead of acquiring content to be displayed, tuning to a channel that a user viewed last time and acquiring content received through a tuned channel.

The first booting operation may be performed to activate a network communication function. The second booting operation may be performed to activate an outputting function of the display apparatus 100 to output video and audio data. Thus, the first booting operation may include driving an OS, mounting an application on a memory, and activating a network communication function, and the second booting operation may include acquiring content, decoding the acquired content, and outputting the decoded content. However, all operations except the outputting content may be included in the first booting operation according to an exemplary embodiment, or the operations may be implemented in other various manners according to an exemplary embodiment.

The controller 120 according to an exemplary embodiment may perform the first booting operation of activating a data communication function in response to a pre-power on command signal received from the communicator 110. Thus, although the controller 120 processes data via a module included in the display apparatus 100, the controller 120 may control the output interface 130 not to output the data.

Next, the communicator 110 may receive information about content from the control device 200. Information about content may include information about a channel via which the content is provided, a uniform resource locator (URL) via which the content is acquired, and an application via which the content is provided.

When information about content is received from the communicator 110, the controller 120 may perform a second booting operation of activating a function of outputting video and audio data.

In addition, the controller 120 may acquire content based on the received information about content. For example, the controller 120 may tune to a channel based on predetermined channel information via which content is provided. Also, the controller 120 may acquire content through the tuned channel. Alternatively, the controller 120 may acquire content from an external server or a content provider based on URL information via which the content is provided.

Alternatively, the controller 120 may execute an application based on information about an application via which content is provided. If no application is installed on the display apparatus 100, the controller 120 may acquire an application install program via the communicator 110. Alternatively, the controller 120 may provide to a user a user interface via which whether to install an application is selected by the user.

Alternatively, the controller 120 may control the output interface 130 to output acquired content. For example, the controller 120 may decode acquired content, and provide the decoded content to the output interface 130.

The output interface 130 according to an exemplary embodiment may be activated as the second booting operation is performed by the controller 120. In FIG. 2, the output interface 130 includes a display 132 and an audio output interface 131 to output video and audio data processed by the display apparatus 100. The output interface 130 may output video and audio data of content received from the controller 120.

If no information about content is provided for a threshold period of time after a pre-power on command signal has been received, the controller 120 may perform an operation of turning off the display apparatus 100. The threshold period of time may be set in the display apparatus 100, and may be modified by a user.

Figure 3:
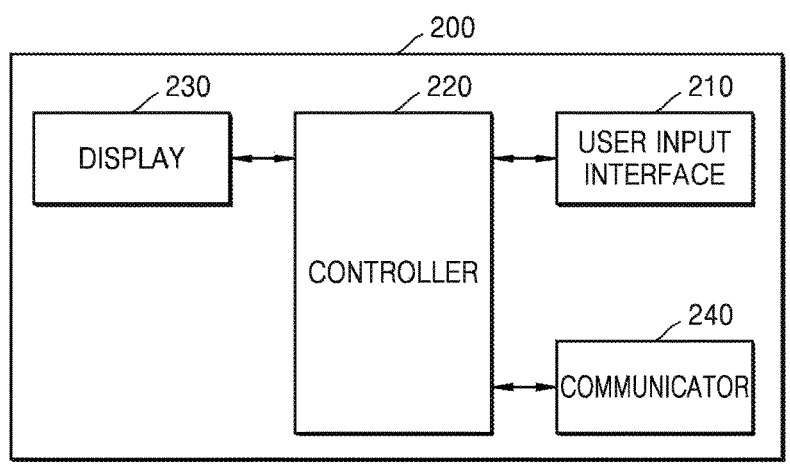
FIG. 3 is a block diagram illustrating a control device according to an exemplary embodiment.

FIG. 3 is a block diagram illustrating the control device 200 according to an exemplary embodiment.

Referring to FIG. 3, the control device 200 includes a user input interface 210, a controller 220, a display 230, and a communicator 240. The control device 200 may be linked to the display apparatus 100, and may be a separate independent device.

The user input interface 210 may be used by a user to input, via the control device 200 or the display apparatus 100, data for controlling the display apparatus 100.

The user input interface 210 according to an exemplary embodiment may receive a user input of turning on the control device 200. Alternatively, the user input interface 210 may sense a user motion with respect to the control device 200 via various sensors (e.g., a proximity sensor, an infrared sensor, a position sensor, or temperature or humidity sensor) included in the control device 200. For example, the user input interface 210 may sense a user motion of gripping the control device 200 or a user motion of tilting the control device 200.

When the control device 200 is an independent device that is not linked to the display apparatus 100, the user input interface 210 may receive a user input of executing an application that controls the display apparatus 100. Examples of the application controlling the display apparatus 100 may include a remote controller application, a video application, a music application, or a photo application.

The controller 220 may control an overall operation of the control device 200. For example, the controller 220 may control the user input interface 210, the display 230, and the communicator 240 or the like overall.

The controller 220 according to an exemplary embodiment may transmit a pre-power on command signal to the display apparatus 100 via the communicator 240 as a user input is received from the user input interface 210.

The communicator 240 may include at least one element that enables communication between the control device 200 and the display apparatus 100 or between the control device 200 and an external device. The communicator 240 may communicate with the display apparatus 100 and/or an external device via, for example, Bluetooth, Bluetooth Low Energy (BLE), Wi-Fi, Zigbee, IrDA, Wi-Fi Direct (WFD), Ultra Wideband (UWB), Wi-Fi, Ethernet or WLAN, but is not limited thereto.

In addition, the controller 220 may perform an operation corresponding to a user input received via the user input interface 210. The controller 220 may turn on the control device 200 as a user motion is sensed via the user input interface 210. Also, the controller 220 may control the display 230 to provide a user interface for selecting content.

The display 230 according to an exemplary embodiment may display information processed by the control device 200. For example, the display 230 may display a user interface for a user to select content according to control of the control device 200. The user interface may be, for example, a content list or a broadcasting channel list.

The user input interface 210 may receive a user input of selecting one piece of content or one broadcasting channel from the content list or the broadcasting channel list. Accordingly, the controller 220 may transmit information about selected content or a selected broadcasting channel to the display apparatus 100 via the communicator 240.

When the control device 200 is an independent device not linked to the display apparatus 100, the controller 220 of the control device 200 may perform a pairing operation with respect to the display apparatus 100. In addition, as a user input is received via the user input interface 210, the controller 220 may execute an application that controls the display apparatus 100. In addition, the controller 220 may transmit information about selected content to the display apparatus 100 via an execution screen of the application via the communicator 240.

Figure 4:
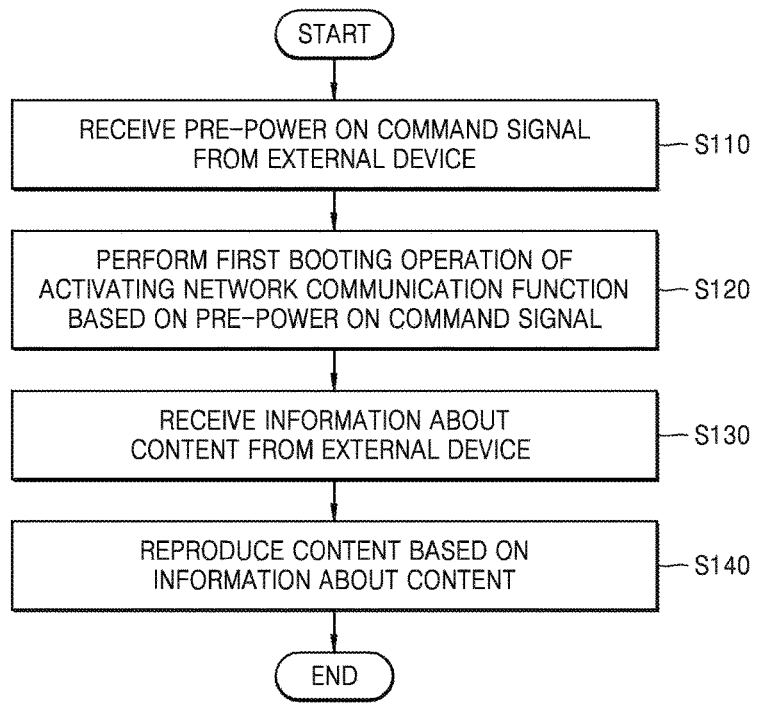
FIG. 4 is a flowchart of a method of displaying content, the method being performed by a display apparatus, according to an exemplary embodiment.

FIG. 4 is a flowchart of a method of displaying contents, the method being performed by the display apparatus 100, according to an exemplary embodiment.

Referring to FIG. 4, in operation S110, the display apparatus 100 receives a pre-power on command signal from an external device. The external device may be a control device linked to the display apparatus 100 or a mobile device of a user on which an application controlling the display apparatus 100 is installed. A pre-power on command signal may be generated in the control device 200 as the control device 200 is turned on. Alternatively, a pre-power on command signal may be generated in the control device 200 as a user input regarding the control device 200 is received.

In operation S120, the display apparatus 100 performs a first booting operation of activating a data communication function via a network based on the pre-power on command signal. As described above, a booting operation of the display apparatus 100 may be divided into a first booting operation and a second booting operation. For example, the first booting operation may be performed to activate a network communication function, and the second booting operation may be performed to activate a function of outputting video and audio data processed by the display apparatus 100.

When a pre-power on command signal is received, the display apparatus 100 according to an exemplary embodiment may perform an operation of driving an OS, installing an application on a memory, and activating a network communication function. Next, the display apparatus 100 may enter a standby state. A standby state of the display apparatus 100 may be, for example, a state in which elements of the display apparatus 100 used to output audio or video or an element of the display apparatus 100 used to input or output data are in an off state but the other elements are in an on state so that the display apparatus 100 is able to communicate with an external device. Alternatively, the standby state of the display apparatus 100 may be, for example, a state in which an element of the display apparatus 100 for performing a network communication function is in an on state so that the display apparatus 100 is able to communicate with an external device.

In operation S130, the display apparatus 100 receives information about content from an external device in a standby state. Information about content may include information about an application via which content is provided, a URL via which the content is acquired, and a channel via which the content is provided. For example, information about an application via which content is provided may include identification information of an application via which content is provided (e.g., a name of an application, an identification code or the like) and information about a content providing path within the application.

In operation S140, the display apparatus 100 reproduces content based on the information about content. According to an exemplary embodiment, when the information about content is received, the display apparatus 100 may perform the second booting operation for outputting video and audio contents. Thus, the display apparatus 100 may perform an operation of acquiring content and an operation of outputting the acquired content. The display apparatus 100 may acquire content from a storage device included outside or inside the display apparatus 100. For example, when information about content is URL information, the display apparatus 100 may access a received URL to acquire content, and output video or audio data of the acquired content. Alternatively, when information about content is broadcasting channel information, the display apparatus 100 may tune to a predetermined channel based on received channel information, and may perform an operation of outputting video and audio data received through the tuned channel.

Figure 5:
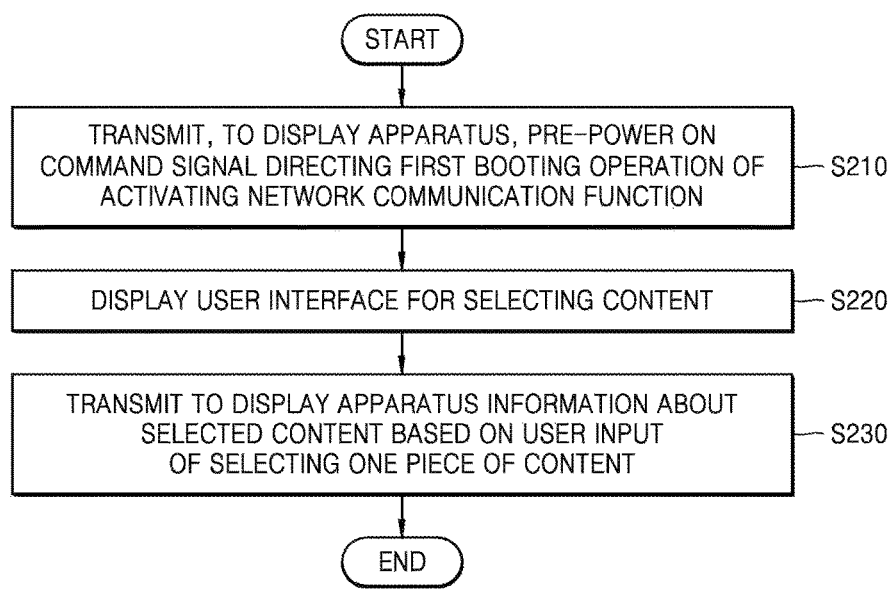
FIG. 5 is a flowchart of a method of controlling a display apparatus, the method being performed by a control device, according to an exemplary embodiment.

FIG. 5 is a flowchart of a method of controlling the display apparatus 100, the method being performed by the control device 200, according to an exemplary embodiment.

Referring to FIG. 5, in operation S210, the control device 200 transmits, to the display apparatus 100, a pre-power on command signal directing or instructing a first booting operation of activating a network communication function. According to an exemplary embodiment, the control device 200 may generate a pre-power on command signal as a user input with respect to the control device 200 is received. The user input may be, for example, a user motion input of gripping the control device 200, a user motion input of tilting the control device 200, a user touch input of touching a screen of the control device 200, or a user button input of pressing a physical button of the control device 200. In addition, the user input may include various inputs of turning on the control device 200. Also, the user input may be an input of executing an application installed on the control device 200. The application may control the display apparatus 100, and may include, for example, a remote controller application, a video application, a music application, or a photo application.

In operation S220, the control device 200 displays a user interface for selecting content. As the control device 200 is turned on, the control device 200 may display a content list in which pieces of content selectable by a user are listed. Alternatively, as the control device 200 is turned on, the control device 200 may display a broadcasting channel list in which identification information of broadcasting channels that may be received by the display apparatus 100 and information about content received via the broadcasting channels are listed.

In operation S230, the control device 200 transmits to the display apparatus 100 information about selected content based on a user input of selecting one piece of content. The information about content may include, for example, information about a channel via which content is provided, information about a URL via which content is acquired, and information about an application via which content is provided. For example, the control device 200 may receive a user input of selecting one piece of content or one broadcasting channel from a screen displaying the content list or the broadcasting channel. Also, the control device 200 may transmit information about a URL of selected content, information about an application via which selected content is provided, or information about a broadcasting channel providing selected content, to the display apparatus 100.

Figure 6:
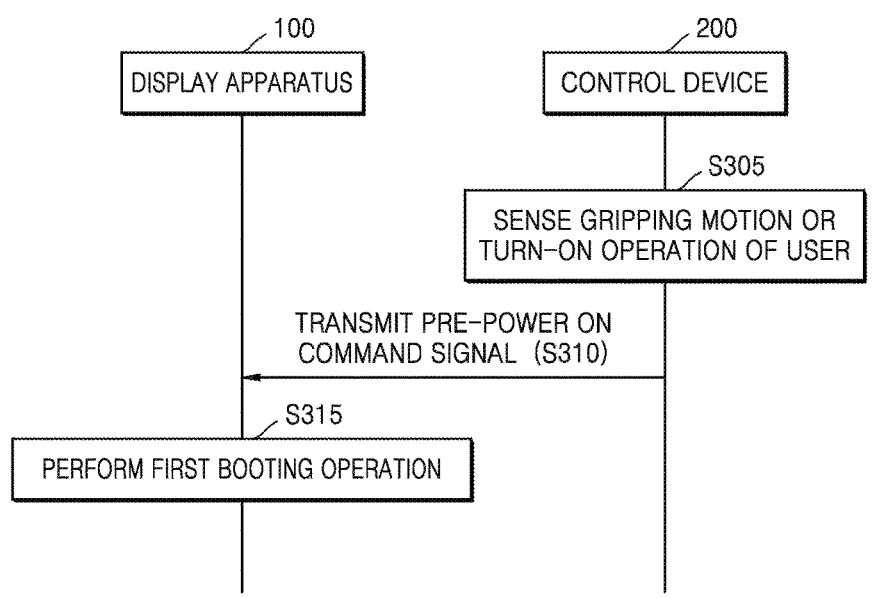
FIG. 6 is a flowchart illustrating a display apparatus receiving a pre-power on command signal from a control device, according to an exemplary embodiment.

FIG. 6 is a flowchart illustrating the display apparatus 100 receiving a pre-power on command signal from the control device 200, according to an exemplary embodiment.

According to an exemplary embodiment, the control device 200 may receive various user inputs. Referring to FIG. 6, in operation S305, the control device 200 may sense a user motion of gripping the control device 200 or receive a user input of turning on the control device 200. Alternatively, the control device 200 may sense a user motion of tilting the control device 200. A user input regarding the control device 200 may be an input of using the display apparatus 100 linked to the control device 200. In operation S310, upon receiving a user input, the control device 200 transmits a pre-power on command signal to the display apparatus 100.

In operation S315, when the pre-power on command signal is received, the display apparatus 100 performs a first booting operation.

Figure 7A:
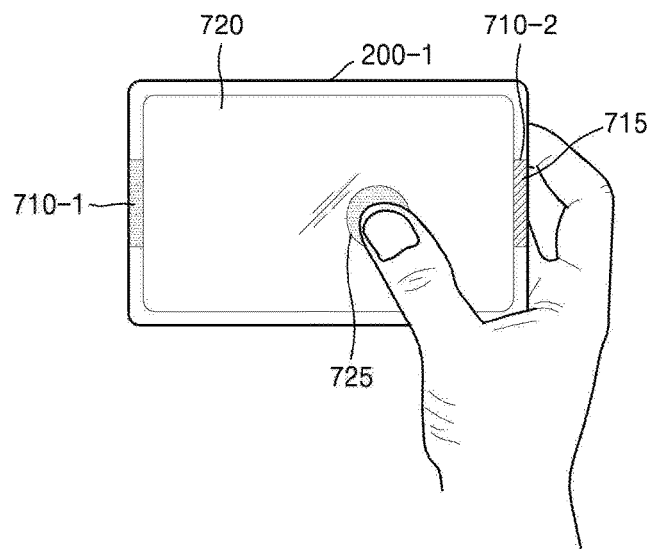
FIGS. 7A and 7B are views in which remote controllers connected to a display apparatus transmit a pre-power on command signal, according to exemplary embodiments.
Figure 7B:
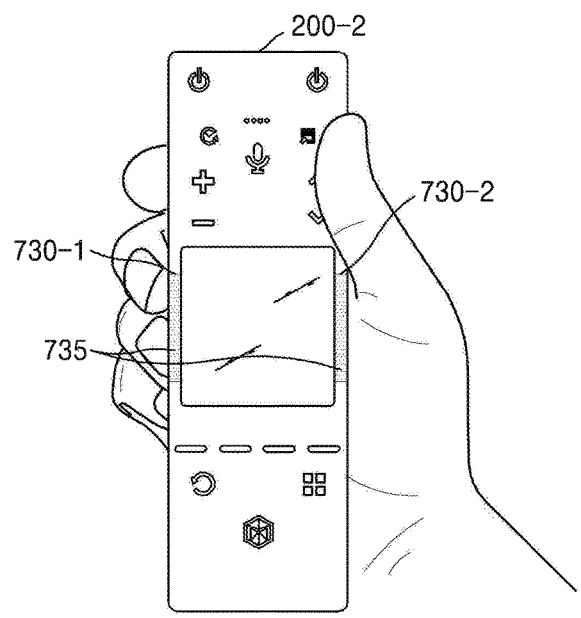

FIGS. 7A and 7B are views in which the remote controllers 200-1 and 200-2 linked to the display apparatus 100 transmit a pre-power on command signal, according to exemplary embodiments.

Referring to FIGS. 7A and 7B, the remote controller 200-1 may sense a gripping motion input 715 of a user with respect to the remote controller 200-1 via proximity sensors 710-1 and 710-2 disposed inside or outside a bezel of a lateral portion of the remote controller 200-1. Alternatively, the remote controller 200-1 may receive a touch input 725 of the user via a screen 720 of the remote controller 200-1. Also, the remote controller 200-1 may transmit a pre-power on command signal to the display apparatus 100 as the gripping motion input 715 or the touch input 725 of the user is received.

While an exemplary embodiment in which the remote controller 200-1 transmits a pre-power on command signal to the display apparatus 100 based on the gripping motion input 715 is described above, the exemplary embodiments are not limited thereto. For example, the remote controller 200 may sense various user motions with respect to the remote controller 200 by using at least one of the proximity sensors 710, a gyro sensor, a position sensor, and a geomagnetic sensor. For example, the remote controller may sense a motion of tilting the remote controller 200. As a user motion is sensed, the remote controller 200 may transmit a pre-power on command signal to the display apparatus 100.

Referring to FIG. 7B, the remote controller 200-2 according to another exemplary embodiment may include physical buttons. In this case, the remote controller 200-2 may sense a griping motion 735 of a user with respect to the remote controller 200-2 by using proximity sensors 730-1 and 730-2 disposed inside or outside a bezel of a lateral portion of the remote controller 200-2. Alternatively, the remote controller 200-2 may sense a user motion with respect to the remote controller 200-2 (e.g., a motion of tilting the remote controller 200-2) by using various sensors included in the remote controller 200-2. The remote controller 200-2 may transmit a pre-power on command signal to the display apparatus 100 as a user motion such as the gripping motion 735 is sensed.

The remote controllers 200-1 and 200-2 of FIGS. 7A and 7B according to the exemplary embodiments may be in a power off state (or a power saving mode) before a user input is received. The power off state may be a state in which the remote controllers 200-1 and 200-2 are connected to a power source but power consumption of the remote controllers 200-1 and 200-2 is minimized. For example, in the power off state, a minimum number of elements of the remote controllers 200-1 and 200-2 that are used to communicate with the display apparatus 100 may be in a power on state. If a user input is received in the power off state, the remote controllers 200-1 and 200-2 may supply power to the elements in the remote controllers 200-1 and 200-2 (for example, the remote controllers 200-1 and 200-2 may be turned on). The remote controllers 200-1 and 200-2 may display a user interface for selecting content as all elements thereof are turned on.

Figure 8:
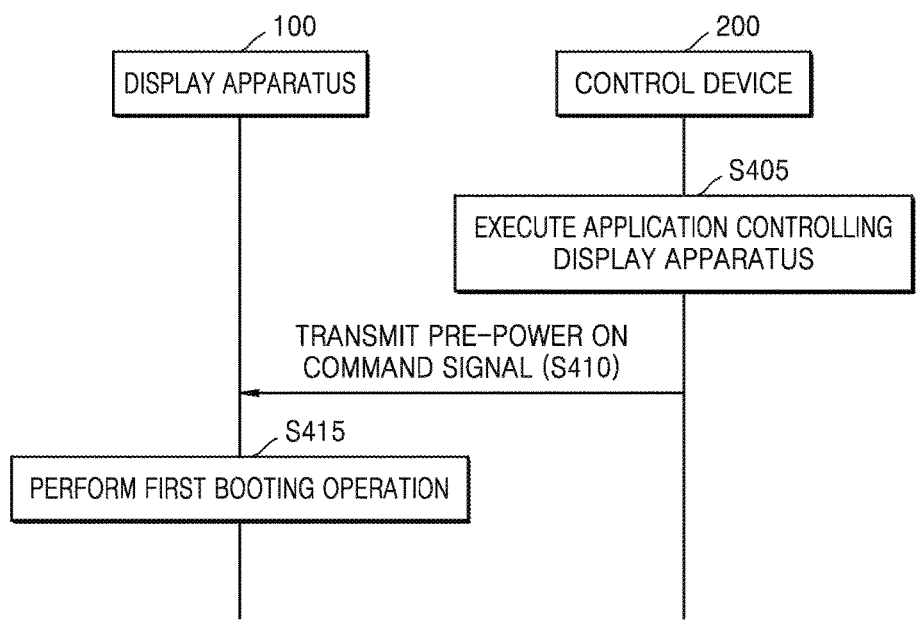
FIG. 8 is a flowchart illustrating a display apparatus receiving a pre-power on command signal from a control device, according to another exemplary embodiment.

FIG. 8 is a flowchart illustrating the display apparatus 100 receiving a pre-power on command signal from the control device 200, according to another exemplary embodiment.

Referring to FIG. 8, in operation S405, the control device 200 receives a user input of executing an application controlling the display apparatus 100. Examples of the application controlling the display apparatus 100 may include a remote controller application, a video application, a music application, and a photo application. The control device 200 may control the display apparatus 100 via the application, and allow content provided via the application to be displayed on the display apparatus 100.

In operation S410, upon receiving a user input of executing an application, the control device 200 transmits a pre-power on command signal to the display apparatus 100. The control device 200 may transmit the pre-power on command signal to the display apparatus 100 by using identification information of the display apparatus 100 registered to the control device 200. Alternatively, the control device 200 may provide a user interface for executing a pairing operation between the display apparatus 100 and the control device 200 according to a user input of executing an application.

In operation S415, the display apparatus 100 performs a first booting operation upon receiving the pre-power on command signal.

Figure 9:
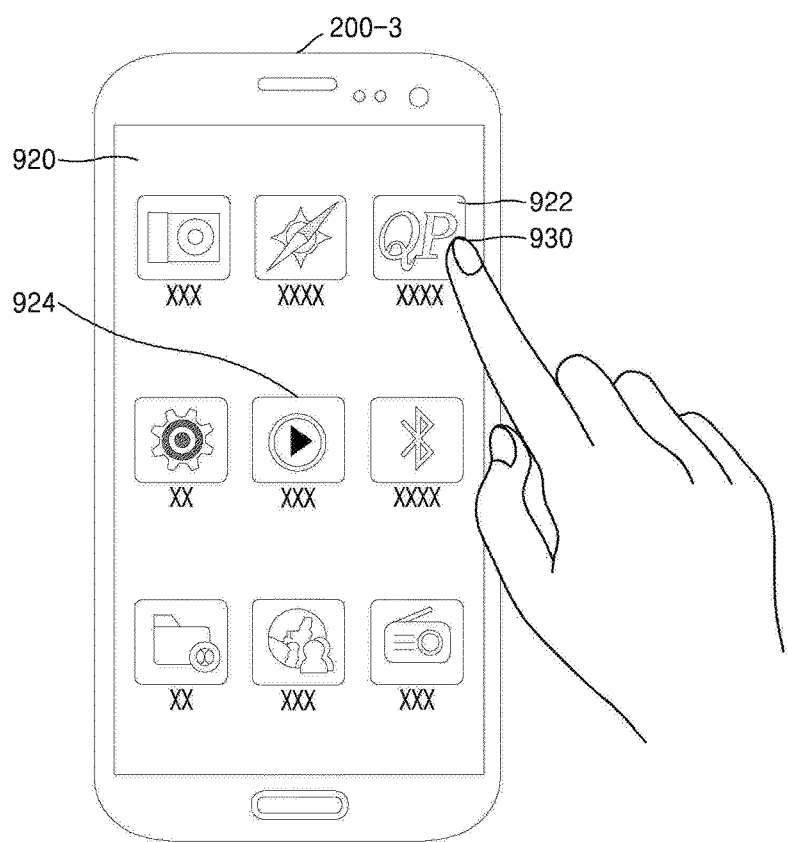
FIG. 9 is a view in which a mobile device of a user transmits a pre-power on command signal, according to an exemplary embodiment.

FIG. 9 is a view in which a mobile device 200-3 of a user transmits a pre-power on command signal, according to an exemplary embodiment.

Referring to FIG. 9, the mobile device 200-3 of the user may receive a user input 930 of selecting a remote controller application 922 that controls the display apparatus 100 on a screen 920 displaying an application list. Alternatively, the mobile device 200-3 may receive a user input of selecting a VOD application 924 on the screen 920 displaying an application list.

Upon receiving a user input of selecting the remote controller application 922 or the VOD application 924, the mobile device 200-3 may transmit a pre-power on command signal to the display apparatus 100. If the mobile device 200-3 is not paired with the display apparatus 100, the mobile device 200-3 may perform a pairing operation between the mobile device 200-3 and the display apparatus 100.

Figure 10:
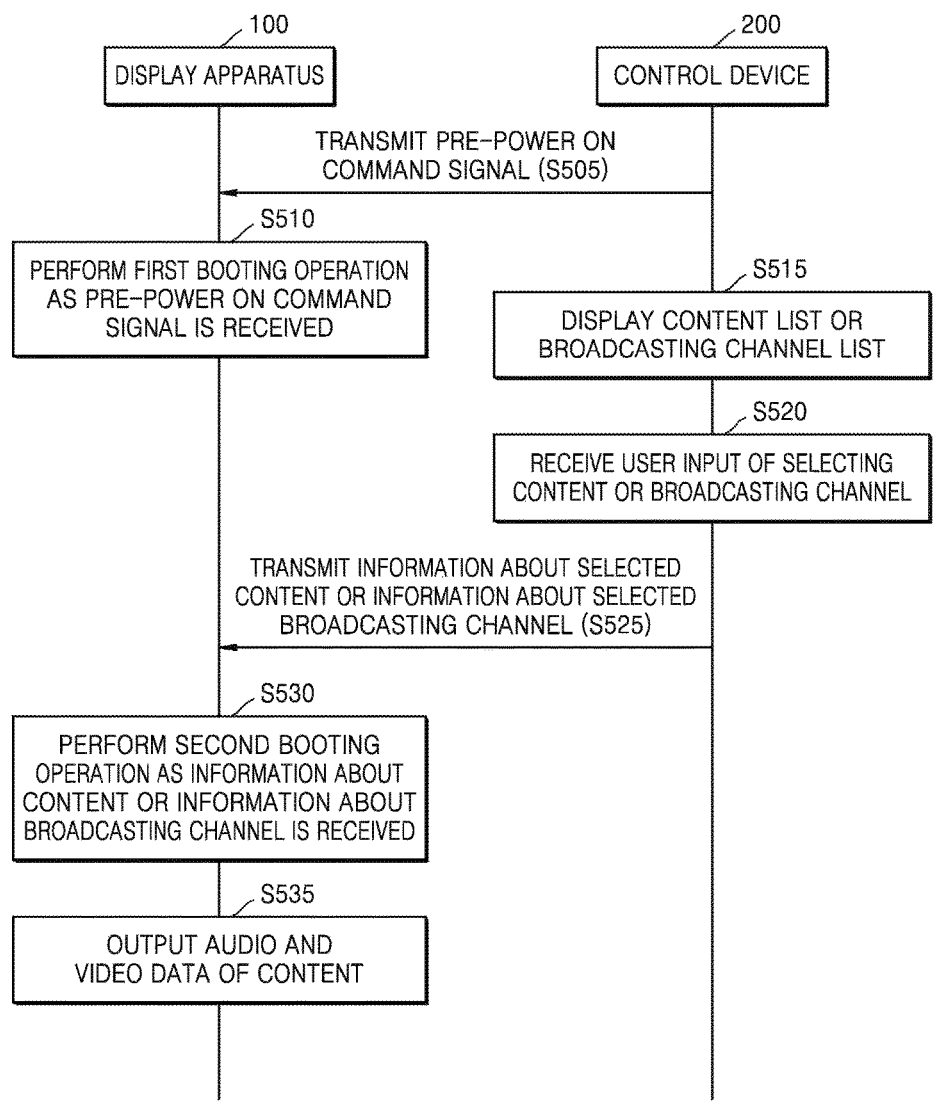
FIG. 10 is a flowchart of a first booting operation and a second booting operation performed by a display apparatus, according to an exemplary embodiment.

FIG. 10 is a flowchart of a first booting operation and a second booting operation performed by the display apparatus 100, according to an exemplary embodiment.

Referring to FIG. 10, in operation S505, the control device 200 transmits a pre-power on command signal to the display apparatus 100 based on a user input with respect to the control device 200. In operation S510, the display apparatus 100 performs a first booting operation as the pre-power on command signal is received. The first booting operation may be an operation of driving an OS of the display apparatus 100 and mounting an application on a memory to thereby activate a network communication function. Thus, after the first booting operation is performed, the display apparatus 100 may perform data communication with an external device including the control device 200 via a network.

Alternatively, the first booting operation may be a booting operation excluding an operation of activating an outputting function with respect to video and audio data of the display apparatus 100. For example, the display apparatus 100 may perform the first booting operation by supplying power to elements except for an element for outputting video or audio.

In operation S515, the control device 200 may display a user interface for turning on the control device 200 and selecting content upon receiving a user input with respect to the control device 200. For example, the user interface may be a content list or a broadcasting channel list. The content list may be a list of contents that may be reproduced by using the display apparatus 100. The broadcasting channel list may be a list of broadcasting channels that may be received by the display apparatus 100. In operation S520, the control device 200 may receive a user input of selecting a piece of content from the content list. Alternatively, the control device 200 may receive a user input of selecting a broadcasting channel from the broadcasting channel list. In operation S525, the control device 200 may transmit information about a selected content or a selected broadcasting channel to the display apparatus 100. For example, the control device 200 may transmit to the display apparatus 100 at least one of information about an application via which content is provided, information about a URL via which content is acquired, and information about a channel via which the content is provided.

In operation S530, the display apparatus 100 performs a second booting operation as information about content or information about a broadcasting channel is received. The second booting operation may be performed to acquire content and activate a function of outputting video and audio data of the acquired content. Alternatively, the second booting operation may be performed to tune to a predetermined channel, and activate an outputting function of video and audio data of content received through the tuned channel. For example, the display apparatus 100 may supply power to an element that is used to output video or audio data processed by using the display apparatus 100.

The display apparatus 100 may acquire content based on information about content or information about a broadcasting channel received from the control device 200. For example, the display apparatus 100 may access a URL received from the control device 200 to acquire content selected by a user. Alternatively, the display apparatus 100 may tune to a broadcasting channel, information of which is received from the display apparatus 100, to acquire content received through the tuned channel. Alternatively, the display apparatus 100 may acquire content selected by a user by executing an application according to information about the application received from the control device 200. A method of acquiring content by executing an application, performed by the display apparatus 100, will be described later with reference to FIG. 13.

In operation S535, the display apparatus 100 outputs audio and video data of the acquired content.

Figure 11A:
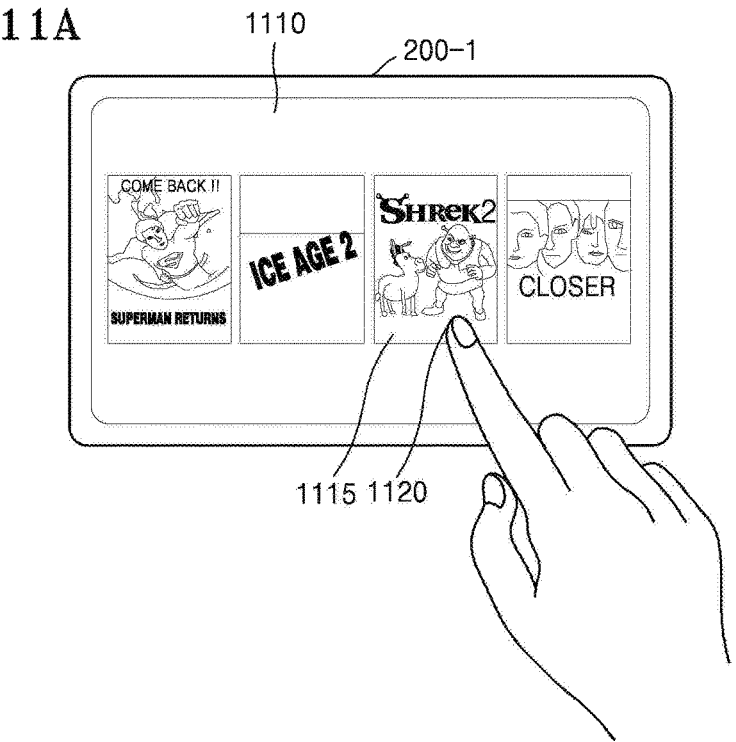
FIG. 11A is a view in which a remote controller provides a user interface for selecting content, according to an exemplary embodiment.
Figure 11B:
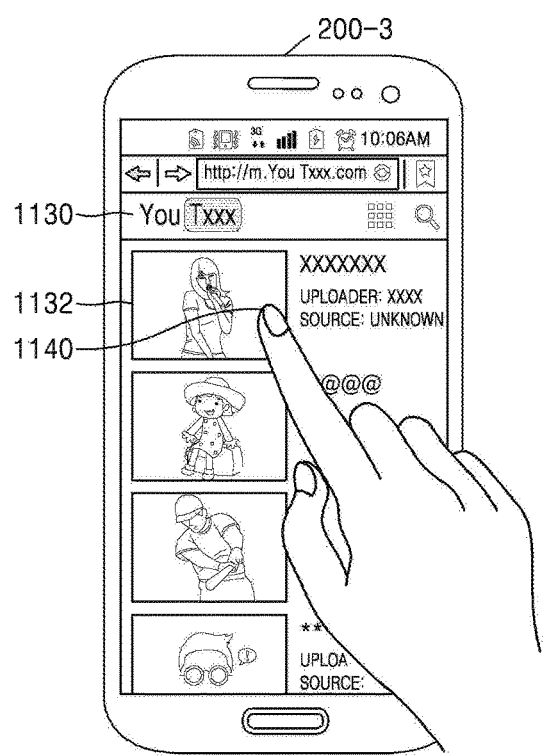
FIG. 11B is a view in which a mobile device of a user provides a user interface for selecting content, according to an exemplary embodiment.

FIG. 11A is a view in which the remote controller 200-1 provides a user interface for selecting content, according to an exemplary embodiment. FIG. 11B is a view in which the mobile device 200-3 of the user provides a user interface for selecting content, according to an exemplary embodiment.

Referring to FIG. 11A, the remote controller 200-1 displays a content list 1110 as the remote controller 200-1 is turned on. The remote controller 200-1 may receive a user input 1120 of selecting a piece of content 1115 from the content list 1110. Accordingly, the remote controller 200-1 may transmit information about a URL regarding selected content, information about an application or information about a broadcasting channel, to the display apparatus 100.

Referring to FIG. 11B, the mobile device 200-3 of the user displays an execution screen 1130 of an application providing a content list. The mobile device 200-3 may receive a user input 1140 of selecting content 1132 from the content list via the execution screen 1130 of the application. When the mobile device 200-3 and the display apparatus 100 are paired, the mobile device 200-3 may transmit information about the content 1132 selected based on information of the display apparatus 100, to the display apparatus 100. When the mobile device 200-3 and the display apparatus 100 are not paired, the mobile device 200-3 may provide a user interface used to pair the mobile device 200-3 and the display apparatus 100.

Figure 12:
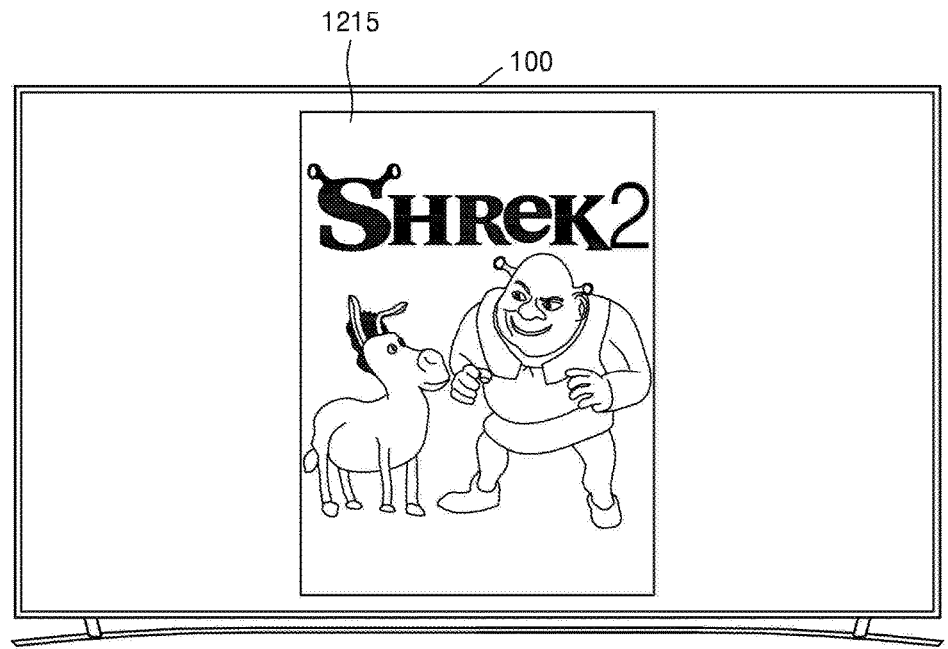
FIG. 12 is a view in which a display apparatus reproduces content as the display apparatus receives information about the content from a control device, according to an exemplary embodiment.
Figure 12:
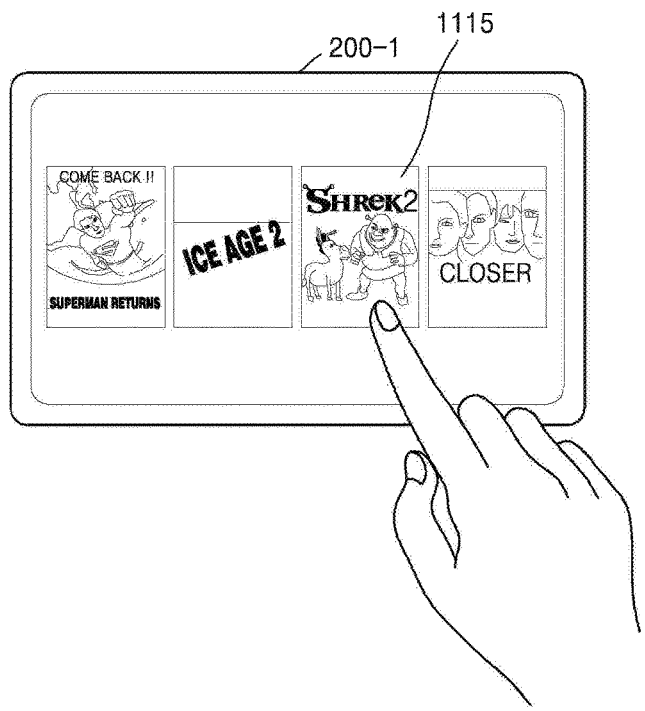

FIG. 12 is a view in which the display apparatus 100 reproduces content as the display apparatus 100 receives information about the content from the control device 200, according to an exemplary embodiment.

As illustrated in FIG. 12, the display apparatus 100 reproduces content 1215 based on the information about the content 1115 selected via the remote controller 200-1 in the example described with reference to FIG. 11A. That is, the user may receive, on the display apparatus 100, content that is selected via the control device 200, without an additional operation of turning on the display apparatus 100.

Figure 13:
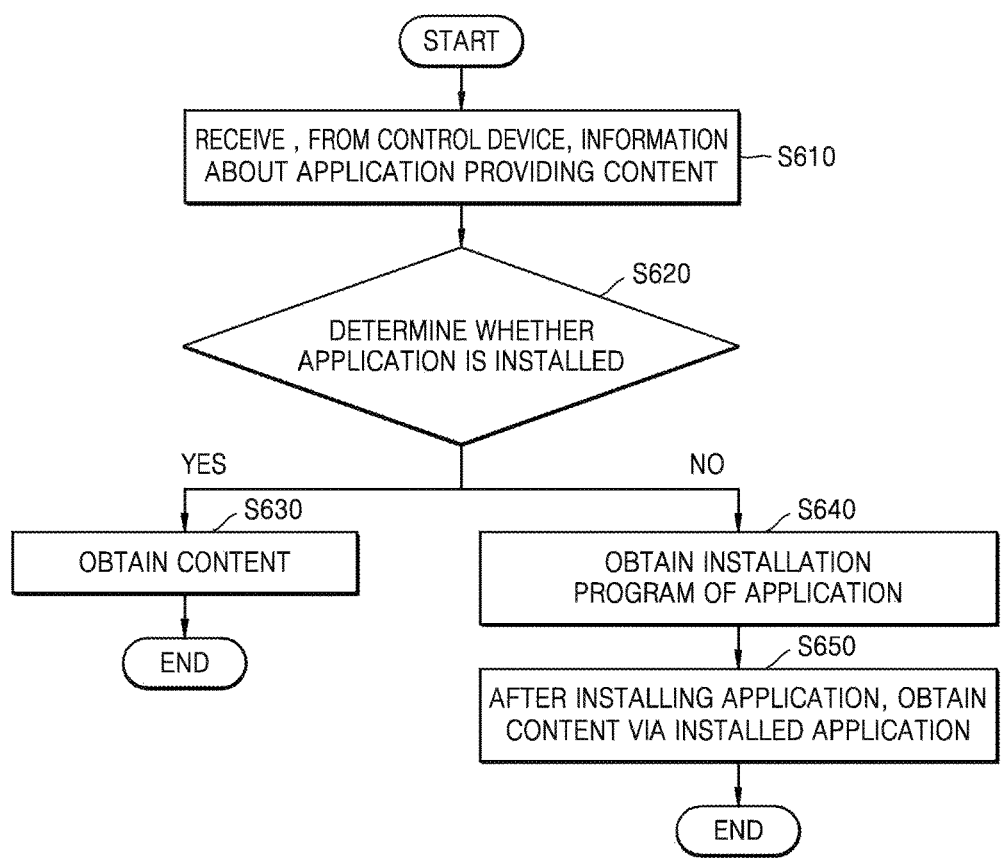
FIG. 13 is a flowchart of a method of obtaining content by executing an application, the method being performed by a display apparatus, according to an exemplary embodiment.

FIG. 13 is a flowchart of a method of obtaining content by executing an application, the method being performed by the display apparatus 100, according to an exemplary embodiment.

Referring to FIG. 13, in operation S610, the display apparatus 100 receives, from the control device 200, information about an application providing content. The information about an application providing content may include identification information of the application (e.g., a name of the application or an identification code of the application) and a content providing path in the application.

In operation S620, the display apparatus 100 determines whether the application is installed on the display apparatus 100 based on identification information of the application received from the control device 200. When the application is installed, the display apparatus 100 continues in operation S630. Otherwise, the display apparatus 100 continues in operation S640.

In operation S630, the display apparatus 100 obtains or acquires content via a content providing path in the application received from the control device 200.

In operation S640, the display apparatus 100 obtains or acquires an application installation program. For example, the display apparatus 100 may acquire an application installation program from an application provider. In operation S650, after installing the application on the display apparatus 100 by using the acquired application installation program, the display apparatus 100 obtains or acquires content via a content providing path in the installed application.

Figure 14:
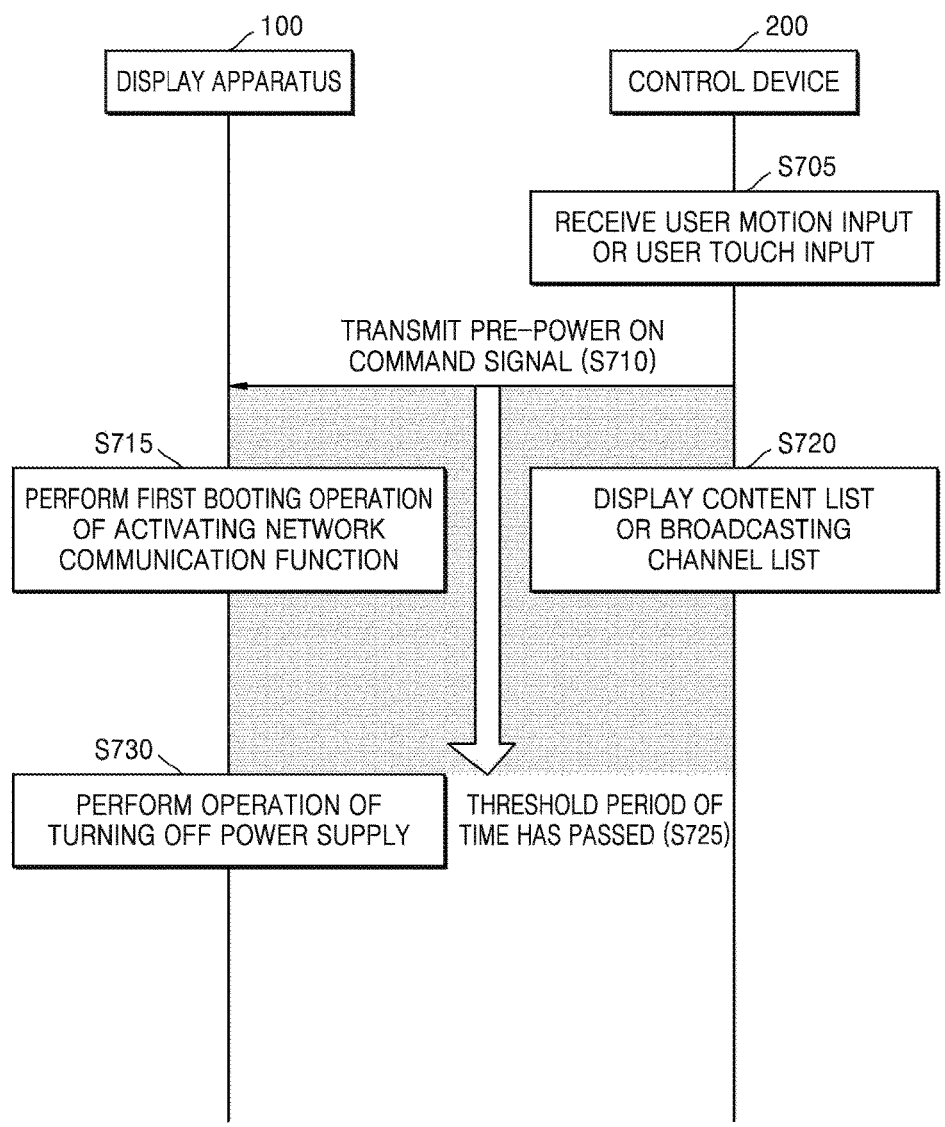
FIG. 14 is a flowchart of a method of turning off a display apparatus when no information about content is received for a threshold period of time after a first booting process is performed, according to an exemplary embodiment.

FIG. 14 is a flowchart of a method of turning off the display apparatus 100 when no information about content is received for a threshold period of time after a first booting operation, according to an exemplary embodiment.

Referring to FIG. 14, in operation S705, the control device 200 receives a user motion input (e.g., a user motion input of gripping the control device 200 or a user motion input of tilting the control device 200) or a user touch input of touching a screen of the control device 200. Alternatively, the control device 200 may receive a user input of turning on the control device 200. In operation S710, the control device 200 transmits a pre-power on command signal to the display apparatus 100.

In operation S715, the display apparatus 100 performs a first booting operation of activating a network communication function upon receiving a pre-power on command signal.

In operation S720, upon receiving a user motion input or a user touch input, the control device 200 displays a user interface for selecting content. The user interface may include a content list or a broadcasting channel list.

In operation S725, the display apparatus 100 may not receive data or a control signal from the control device 200 for a threshold period of time after having received the pre-power on command signal. In this case, in operation S730, the display apparatus 100 may perform an ending operation of turning off the display apparatus 100. For example, the display apparatus 100 may store configuration settings of the display apparatus 100 and stop a supply of power to the internal elements of the display apparatus 100.

FIG. 15 is a detailed block diagram of the display apparatus 100 and the control device 200, according to an exemplary embodiment.

Referring to FIG. 15, in addition to the communicator 110, the controller 120, and the output interface 130 of FIG. 2, the display apparatus 100 further includes a tuner 140, a microphone 150, a camera 160, an input/output interface 180, a storage 170, and a power supply 190.

In FIG. 15, the controller 120 includes a processor 121, a read only memory (ROM) 122 in which a control program for controlling the display apparatus 100 is stored, and a random access memory (RAM) 123 to be used to store a signal or data inputted from the outside of the display apparatus 100 or used as a storage region corresponding to various tasks to be performed by the display apparatus 100.

The controller 120 controls an overall operation of the display apparatus 100 and a signal flow between the internal elements of the display apparatus 100 and executes a function of processing data, as described above. The controller 120 controls power to be supplied from the power supply 190 to the internal elements. In addition, when a user input is received or a previously set and stored condition is met, the controller 120 may execute an OS and various applications stored in the storage 170.

The processor 121 may include a graphic processing unit (GPU) for graphic processing corresponding to a video or an image. The processor 121 may be implemented by a system on chip (SoC) in which a core and the GPU are integrated. The processor 121 may include a single core, dual cores, triple cores, quadruple cores, or cores of a multiple thereof.

In addition, the processor 121 may include a plurality of processors. For example, the processor 121 may be implemented by a main processor and a sub-processor that operates in a sleep mode. In FIG. 15, the processor 121, the ROM 122, and the RAM 123 are mutually connected through a bus 124. The controller 120 of the display apparatus 100 according to an exemplary embodiment refers to the processor 121, the ROM 122, and the RAM 123.

According to an exemplary embodiment, upon receiving a pre-power on command signal from the control device 200, the controller 120 may perform a first booting operation of activating a network communication function to perform data communication with an external device (e.g., the control device 200, a content provider or a broadcasting provider) via the communicator 110. Upon receiving a pre-power on command signal, the controller 120 may instruct the power supply 190 to supply power to some of the elements, including the communicator 110, to thereby perform the first booting operation.

After performing the first booting operation, the controller 120 may set the display apparatus 100 in a standby state. A standby state of the display apparatus 100 may indicate a state, in which the output interface 130 for outputting audio or video or the input/output interface 180 for inputting or outputting data is in an off state but the other elements are in an on state so that the display apparatus 100 is able to communicate with an external device. Alternatively, the standby state of the display apparatus 100 may include a state, in which only the communicator 110 of the display apparatus 100 is in an on state so that the display apparatus 100 is able to communicate with an external device.

In addition, upon receiving information about content from the control device 200 in a standby state of the display apparatus 100, the controller 120 may perform a second booting operation to output video or audio data. That is, upon receiving information about content, the controller 120 may instruct the power supply 190 to supply power to the other elements of the display apparatus 100, including the output interface 130, to thereby perform a second booting operation. Also, the controller 120 may acquire content via the communicator 110 based on the information about content, and reproduce the acquired content. If the information about content includes broadcasting channel information, the controller 120 may control the tuner 140 to acquire broadcasting content.

In FIG. 15, the audio output interface 132 includes at least one among a speaker 133, a headphone 134, and a Sony/Philips Digital Interface Format (S/PDIF) port 135.

The tuner 140 may select a channel that is desired to receive in the display apparatus 100 by tuning only a frequency of the channel from many electronic wave components through amplification, mixing, resonance of a broadcast signal received in a wired or wireless manner. The broadcast signal may include audio, video, and additional information (e.g., Electronic Program Guide (EPG)).

The tuner 140 may receive the broadcast signal in a frequency band corresponding to a channel number (e.g., a cable broadcast channel number 506) according to an input (e.g., a channel number input, a channel up/down input, or the like) from the control device 200. The tuner 140 may receive the broadcast signal from various sources such as terrestrial broadcasting stations, cable broadcasting stations, satellite broadcasting stations, Internet broadcasting stations, and the like. The tuner 140 may receive the broadcast signal from sources such as analog broadcasting stations, digital broadcasting stations, and the like. The broadcast signal received through the tuner 140 is decoded (e.g., audio decoding, video decoding, or additional information decoding) and separated into audio, video, and/or additional information. The separated audio, video, and/or additional information may be stored in the storage 170 under control of the controller 120. The display apparatus 100 may include one or more tuners 140.

The tuner 140 may be implemented to be all-in-one with the display apparatus 100 or as a separate device (e.g., a set-top box, a tuner connected to the input/output interface 170) having a tuner electrically connected to the display apparatus 100.

The communicator 110 may connect the display apparatus 100 with an external device (e.g., the control device 200, a content provider, or a broadcasting provider) under control of the controller 120. The controller 120 may transmit or receive content to or from the external device connected through the communicator 110, download an application installation program from the external device, or perform web browsing through the communicator 110. The communicator 110 may include at least one among a WLAN interface 111, a Bluetooth interface 112, and an Ethernet interface 113, an IrDA interface 114, and an optical receiver 115 in correspondence with the performance and structure of the display apparatus 100. The communicator 110 may receive a pre-power on command signal from the control device 200. The pre-power on command signal may be implemented by a Bluetooth type signal, an RF signal type signal, or a Wi-Fi type signal.

In addition, the communication unit 110 may further include short-distance communication interfaces (e.g., a near field communication (NFC) interface, a BLE interface, a Zigbee interface, a WFD interface, or a UWB interface.

The optical receiver 115 may receive an optical signal (including a control signal) received from the control device 200, through an optical window or the like of a bezel of the display 132. The optical receiver 115 may receive an optical signal corresponding to a user input (e.g., a touch, a press, a touch gesture, a voice, or a motion) from the control device 200. A control signal may be extracted from the received optical signal under control of the controller 120.

According to an exemplary embodiment, the communicator 110 may receive a pre-power on command signal and information about content from the control device 200, and provide the received pre-power on command signal and the information about content to the controller 120. Also, the communicator 110 may receive various control signals from the control device 200, and provide the control signals to the controller 120. In addition, the communicator 110 may acquire content from a content provider or a broadcasting provider under control of the controller 120.

The microphone 150 may receive an uttered voice of the user. The microphone 150 may convert the received voice into an electrical signal and transmit the converted electrical signal to the controller 120. The voice of the user may include, for example, a voice corresponding to a menu or function of the display apparatus 100. A recognition range of the microphone 150 is recommended to be within 4 m from the microphone 150 to a location of the user and may vary depending on a magnitude of the voice of the user and a surrounding environment (e.g., a speaker sound and surrounding noise).

The microphone 150 may be implemented to be all-in-one with or to be separated from the display apparatus 100. The separated microphone 150 may be electrically connected to the display apparatus 100 through the communicator 110 or the input/output interface 180. The microphone 150 may be omitted from the display apparatus 100 according to performance and structure of the display apparatus 100.

The camera 160 may capture an image corresponding to a motion of a user including a gesture within a range of camera perception (for example, consecutive frames). For example, a perception range of the camera 160 may be within a distance of about 0.1 m to about 5 m from a user. A user motion may include motions of the body part of a user such as a face, a facial expression, a hand, a fist, or a finger. The camera 160 may convert a received image into an electrical signal and output the electrical signal to the controller 120 under control of the controller 120.

By using a result of recognizing a received motion, the controller 120 may select a menu displayed on the display apparatus 100 or conduct control corresponding to the result of recognizing the motion. For example, the control may include channel adjustment, volume adjustment, and movement of an indicator.

The camera 160 may include a lens and an image sensor. The camera 160 may support an optical zoom or a digital zoom by using a plurality of lenses and via image processing by using an image processor or the controller 120. A perception range of the camera 160 may be set in various manners according to an angle of a camera and a surrounding environment condition. When the camera 160 includes a plurality of cameras, a three-dimensional still image or a three-dimensional motion may be received by using the plurality of cameras.

The camera 160 may be implemented to be all-in-one with or to be separated from the display apparatus 100. An additional device including the separated camera 160 may be electrically connected to the display apparatus 100 through the communicator 110 or the input/output interface 180.

The storage 170 may store various pieces of data, programs, and/or applications for driving and controlling the display apparatus 100, under control of the controller 120. The storage 170 may store input/output signals or data corresponding to driving of the communicator 110, the output interface 130, the tuner 140, the power supply 190, and the input/output interface 180. The storage 170 may store control programs for controlling the display apparatus 100 and the controller 120, applications initially provided by a manufacturer and downloaded from the outside, graphical user interfaces (GUIs) related to the applications, objects (e.g., image texts, icons, buttons, and the like) for providing the GUIs, user information, documents, databases (DBs), and/or relevant data.

According to an exemplary embodiment, the term "storage" may include the storage 170, the ROM 122 and the RAM 123 in the controller 120, and a memory card (e.g., a micro secure digital (SD) card, a USB memory, and the like) inserted into the display apparatus 100. In addition, the storage 170 may include a nonvolatile memory, a volatile memory, and a hard disk drive (HDD) or a solid state drive (SDD).

The storage 170 may include a broadcast reception module, a channel control module, a volume control module, a communication control module, a voice recognition module, a motion recognition module, an optical reception module, a display control module, an audio control module, an external input control module, a power control module, a module for controlling power of an external device connected in a wireless manner (e.g., Bluetooth), a voice DB, and/or a motion DB. The modules and DBs of the storage 170 may be implemented in a software form to execute, in the display apparatus 100, a broadcast reception control function, a channel control function, a volume control function, a communication control function, a voice recognition function, a motion recognition function, an optical reception control function, a display control function, an audio control function, an external input control function, a power control function, and/or a function of controlling power of an external device connected in a wireless manner (e.g., Bluetooth). The controller 120 may execute each of the functions by using the software stored in the storage 170.

The storage 170 may store a profile corresponding to turning on or off of the display apparatus 100.

The storage 170 may store information about content received from the control device 200.

In addition, the display apparatus 100 including the display 132 may be electrically connected to an additional external device having a tuner (for example, a set-top box). For example, the display apparatus 100 may be an analog TV, a digital TV, a 3D TV, a smart TV, a LED TV, an OLED TV, a plasma TV, or a monitor, but is not limited thereto.

The input/output interface 180 receives a video (e.g., a moving picture or the like), audio (e.g., a voice, music, or the like), and additional information (e.g., EPG or the like) from the outside of the display apparatus 100, under control of the controller 120. The input/output interface 180 may include at least one among a high-definition multimedia interface (HDMI) port 181, a component jack 182, a PC port 183, and a universal serial bus (USB) port 184.

The power supply 190 supplies power input from an external power source to the elements in the display apparatus 100 according to control of the controller 120. Also, the power supply 190 may supply power output from one or more batteries located in the display apparatus 100 according to control of the controller 120, to the elements 110 through 180 in the display apparatus 100.

When the controller 120 receives a pre-power on command signal of the display apparatus 100 via the communicator 110 according to an exemplary embodiment, the power supply 190 may supply power to the elements used to activate a network communication function, according to a command of the controller 120. Alternatively, the power supply 190 may perform a first booting operation by supplying power to the other elements of the display apparatus 100 than those for outputting video or audio according to a command of the controller 120. In addition, the other operations (for example, an operation of activating a network communication function) could be included in the first booting operation.

Also, when the controller 120 receives information about content via the communicator 110, the power supply 190 may supply power to all elements of the display apparatus 100 according to an instruction of the controller 120 to thereby perform a second booting operation.

In regard to the elements illustrated as being included in the display apparatus 100 of FIG. 15 (for example, the elements 110 through 190), at least one element may be added thereto or removed therefrom according to performance of the display apparatus 100. In addition, locations of the elements (for example, the elements 110 through 190) may be modified according to performance or structure of the display apparatus 100.

Referring to FIG. 15, the control device 200 may be connected to the display apparatus 100 via the communicator 240 in a wireless manner (for example, via a Bluetooth interface 241). The control device 200 may transmit a control signal or data to the display apparatus 100 that is wirelessly connected to the control device 200.

Referring to FIG. 15, the control device 200 further includes a power supply 250 in addition to the user input interface 210, the controller 220, the display 230, and the communicator 240 of FIG. 3.

The user input interface 210 may refer to the control device 200 or a unit for inputting data used to control the display apparatus 100 via the control device 200. For example, the user input interface 210 may be a key pad, a dome switch, a touch pad (e.g., a capacitive overlay, resistive overlay, infrared beam, integral strain gauge, surface acoustic wave, or piezoelectric type touch pad), a jog wheel, or a jog switch, but is not limited thereto. Also, the user input interface 210 may include various sensors for sensing motion of a user. For example, the user input interface 210 may include at least one of a proximity sensor, an infrared sensor, and a temperature/humidity sensor.

According to an exemplary embodiment, the user input interface 210 may receive a user input of turning on the control device 200. Alternatively, the user input interface 210 may receive a user input with respect to the display 230 of the control device 200. Alternatively, the user input interface 210 may sense a user motion. Alternatively, the user input interface 210 may receive a user input of executing an application controlling the display apparatus 100.

In addition, the user input interface 210 may receive a user input of selecting one piece of content on a screen providing a user interface for selecting the content.

The controller 220 performs a function of controlling an overall operation of the control device 200 and a signal flow between elements in the control device 200, and a data processing function. The controller 220 may control power supplied from the power supply 250 to the elements.

According to an exemplary embodiment, the controller 220 may control power to be supplied to the elements via the power supply 250 as a user input is received via the user input interface 210. Also, the controller 220 may control the display 230 to provide a user interface for selecting content.

Also, the controller 220 may obtain information about selected content via a user interface from an internal storage or an external device (for example, a content provider or a broadcasting provider). The controller 220 may transmit information about the obtained content to the display apparatus 100 via the communicator 240.

The display 230 may display information processed by using the controller 220. The display 230 and a touch pad may be in a layer structure to configure a touch screen. In this case, the display 230 may also be used as an input device in addition to as an output device.

The communicator 240 may be wirelessly connected to the display apparatus 100 according to control of the controller 220. In FIG. 15, the communicator 240 includes the Bluetooth interface 241 and an IrDA interface 242, and may further include other short-range communication interface (e.g., NFC) interface, a BLE interface). In addition, in FIG. 15, the communicator 240 further includes a WLAN interface 243 used to communicate with an external device (for example, a content provider or a broadcasting provider).

According to an exemplary embodiment, the communicator 240 may transmit a control signal such as a pre-power on command signal to the display apparatus 100. In addition, the communicator 240 may transmit information about content to the display apparatus 100 according to control of the controller 220.

The power supply 250 may supply power input from an external power source, to the elements in the control device 200, according to control of the controller 220. Also, the power supply 250 may supply power output from one or more batteries located in the control device 200, to the elements of the control device 200 according to control of the control device 200.

In regard to the elements illustrated as being included in the control device 200 of FIGS. 3 and 5, at least one element may be added thereto or removed therefrom according to performance of the control device 200. In addition, locations of the elements may be modified according to performance or structure of the control device 200.

In addition, the exemplary embodiments may also be implemented through computer-readable code and/or instructions on a medium, e.g., a computer-readable medium, to control at least one processing element to implement any above-described embodiments. The medium may correspond to any medium or media that may serve as a storage and/or perform transmission of the computer-readable code.

The computer-readable code may be recorded and/or transferred on a medium in a variety of ways, and examples of the medium include recording media, such as magnetic storage media (e.g., ROM, floppy disks, hard disks, etc.) and optical recording media (e.g., compact disc read only memories (CD-ROMs) or digital versatile discs (DVDs)), and transmission media such as Internet transmission media. Thus, the medium may have a structure suitable for storing or carrying a signal or information, such as a device carrying a bitstream according to one or more exemplary embodiments. The medium may also be on a distributed network, so that the computer-readable code is stored and/or transferred on the medium and executed in a distributed fashion. Furthermore, the processing element may include a processor or a computer processor, and the processing element may be distributed and/or included in a single device.

The foregoing exemplary embodiments are examples and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. A display apparatus comprising:
a communicator configured to receive a pre-power on command signal from an external device; and
a controller configured to activate a network communication function of the display apparatus, and control to maintain an off state of an outputting function of the display apparatus with respect to video and audio data, in response to the pre-power on command signal being received,
wherein the communicator is further configured to receive information of content from the external device after the network communication function is activated, and
the controller is further configured to:
activate the outputting function of the display apparatus in response to the information of the content being received; and
reproduce the content, based on the information of the content, using the activated outputting function.

2. The display apparatus of claim 1, wherein the controller is further configured to:
obtain the content based on the information of the content; and
output video and audio data of the obtained content.

3. The display apparatus of claim 2, wherein the information of the content comprises at least one among information of an application providing the content, information of a universal resource locator via which the content is obtained, and information of a channel via which the content is provided.

4. The display apparatus of claim 3, wherein the information of the content is the information of the application providing the content, and
the controller is further configured to:
determine whether the application is installed based on the information of the application; and
obtain the content via the application, in response to the controller determining that the application is installed.

5. The display apparatus of claim 4, wherein the controller is further configured to obtain an installation program of the application, in response to the controller determining that the application is not installed.

6. The display apparatus of claim 1, wherein the controller is further configured to turn off a power supply of the display apparatus, in response to the communicator not receiving the information of the content during a period of time after the communicator receives the pre-power on command signal.

7. The display apparatus of claim 1, wherein the pre-power on command signal is generated in the external device based on a user motion input with respect to the external device.

8. A control device comprising:
a communicator configured to transmit, to an external display apparatus, a pre-power on command signal directing an activation of a network communication function of the external display apparatus with an outputting function of the display apparatus with respect to video and audio data being in an off state;
a display configured to display a user interface for selecting content; and
a controller configured to control the communicator to transmit information of the selected content to the external display apparatus, based on a user input of selecting the content via the user interface to activate the outputting function of the display apparatus for reproducing the content.

9. A method of displaying content, the method being performed by a display apparatus, and the method comprising:
receiving a pre-power on command signal from an external device;
activating a network communication function of the display apparatus, and maintaining an off state of an outputting function of the display apparatus with respect to video and audio data, in response to the pre-power on command signal being received;
receiving information of the content from the external device after the network communication function is activated;
activating the outputting function of the display apparatus in response to the information of the content being received; and
reproducing the content, based on the information of the content, using the activated outputting function.

10. The method of claim 9, wherein the reproducing further comprises:
obtaining the content based on the information of the content; and
outputting video and audio data of the obtained content.

11. The method of claim 10, wherein the information of the content comprises at least one among information of an application providing the content, information of a universal resource locator via which the content is obtained, and information of a channel via which the content is provided.

12. The method of claim 10, wherein the information of the content is the information of an application providing the content, and
the obtaining comprises:
determining whether the application is installed based on the information of the application; and
obtaining the content via the application, in response to the determining that the application is installed.

13. The method of claim 12, wherein the obtaining the content based on the information of the content further comprises obtaining an installation program of the application, in response to the determining that the application is not installed.

14. The method of claim 9, further comprising turning off a power supply of the display apparatus, in response to not receiving the information of the content during a period of time after the receiving the pre-power on command signal.

15. The method of claim 9, wherein the pre-power on command signal is generated in the external device based on a user motion input with respect to the external device.

16. A non-transitory computer-readable storage medium storing a program to cause a computer to perform the method of claim 9.

17. A method of controlling an external display apparatus, the method being performed by a control device, and the method comprising:
transmitting, to the external display apparatus, a pre-power on command signal directing an activation of a network communication function of the external display apparatus with an outputting function of the display apparatus with respect to video and audio data being in an off state;
displaying a user interface for selecting content; and
transmitting information of the selected content to the external display apparatus, based on a user input of selecting the content via the user interface to activate the outputting function of the display apparatus for reproducing the content.

18. A non-transitory computer-readable storage medium storing a program to cause a computer to perform the method of claim 17.

\* \* \* \* \*